A. A. HORTON.
ADDING MACHINE.
APPLICATION FILED JULY 22, 1914.

1,229,461. Patented June 12, 1917.
10 SHEETS—SHEET 1.

A. A. HORTON.
ADDING MACHINE.
APPLICATION FILED JULY 22, 1914.

1,229,461.

Patented June 12, 1917.
10 SHEETS—SHEET 3.

Witnesses
E. R. Barrett
Robert Dobberman

Inventor
Allen A. Horton

Attorneys

A. A. HORTON.
ADDING MACHINE.
APPLICATION FILED JULY 22, 1914.

1,229,461.

Patented June 12, 1917.
10 SHEETS—SHEET 10.

Witnesses
E. R. Barrett
Robert Dobbermann

Inventor
Allen A. Horton

By
Attorneys

UNITED STATES PATENT OFFICE.

ALLEN A. HORTON, OF DETROIT, MICHIGAN, ASSIGNOR TO BURROUGHS ADDING MACHINE COMPANY, OF DETROIT, MICHIGAN, A CORPORATION OF MICHIGAN.

ADDING-MACHINE.

1,229,461. Specification of Letters Patent. Patented June 12, 1917.

Application filed July 22, 1914. Serial No. 852,367.

*To all whom it may concern:*

Be it known that I, ALLEN A. HORTON, a citizen of the United States, residing at Detroit, in the county of Wayne and State of Michigan, have invented certain new and useful Improvements in Adding-Machines, of which the following is a specification.

The object of the present invention is to equip an adding machine for automatic operation in the making up of progressive tables such for example as used for rates of exchange or for readily ascertaining the remainders when the same quantity has been repeatedly deducted, or as constituting a pay-roll chart such as employed in factories and other business establishments. I aim to accomplish periodical addition of the constant upon the registering wheels and the successive printing of progressing amounts all in a thoroughly automatic manner, that is to say without the necessity for any such manipulation as either the setting down of amount keys through finger pressure each time the constant is to be added or the depression of a special key or keys such as the familiar total or subtotal keys when the progressive amount is to be printed. In carrying out my invention in the manner here shown, I maintain pressure upon the selected keys during all of the operations but restrain the pressure-applying means except when an ensuing operation of the machine should add the constant, and I provide for automatically setting subtotaling devices for the printing of the progressing amounts. I further provide for disabling the printing mechanism of the machine except when these progressing amounts are to be printed and I furthermore provide for disabling the line-spacing mechanism except in the same connection in order that a compact column of progressing amounts may be had.

I have chosen to illustrate my invention as adapted to the well-known Burroughs adding and listing machine, the carrying and totalizing systems of which are such as to call for a blank stroke or operation as a preliminary to the taking of a total,—this on account of the necessity for having certain members of the carrying mechanism in position to serve as stops for the wheels at zero positions under backward rotation. Therefore, in the present adaptation of my invention I make provision for the intervention of a blank stroke or operation between an operation which adds the constant and an operation which prints the progressive amount.

I am aware that it is not broadly new with me to run a list of automatically progressing numbers by practising subtotaling operations. Reference may be had in this connection to prior Patent No. 998,716, issued July 25, 1911, on the invention of George B. Putnam, which patent discloses an arrangement applied to the Burroughs machine for effecting the automatic printing of consecutive numbers,—a single increment of movement being given to the lowest order wheel of a left-hand section of accumulating wheels in successive operations of the machine and subtotals being printed which correspondingly increase by one. There is here involved no selection and automatic repetition in depression of amount keys for the repeated registration of a predetermined constant, nor is there such automatic setting of totaling devices as is concerned in the carrying out of my invention. I am further aware that the automatic setting of totaling devices is not of itself broadly new. In this connection reference may be had to prior Patent No. 1,050,039, issued January 7, 1913, upon the invention of Heber C. Peters and to Patent No. 1,023,895, issued April 23, 1912, upon the invention of Jesse G. Vincent. Each of these patents shows an arrangement whereby totaling devices may be automatically set by blank strokes of the operating handle of the machine and the Vincent patent shows a modification which provides for the automatic setting of subtotaling devices as distinguished from grand totaling devices. However, neither of these patents discloses means for causing the registration of a predetermined amount such as the constant of a progressive table to automatically intervene between totaling operations.

With the above stated and certain incidental objects in view which will later become apparent, the invention consists in certain novel features of construction and combinations of elements, the essentials whereof are recited in the appended claims and a preferred form of embodiment of which is illustrated in detail in the accompanying drawings and specifically described hereinafter.

Referring to the accompanying drawings which form part of this specification.

Figure 4:
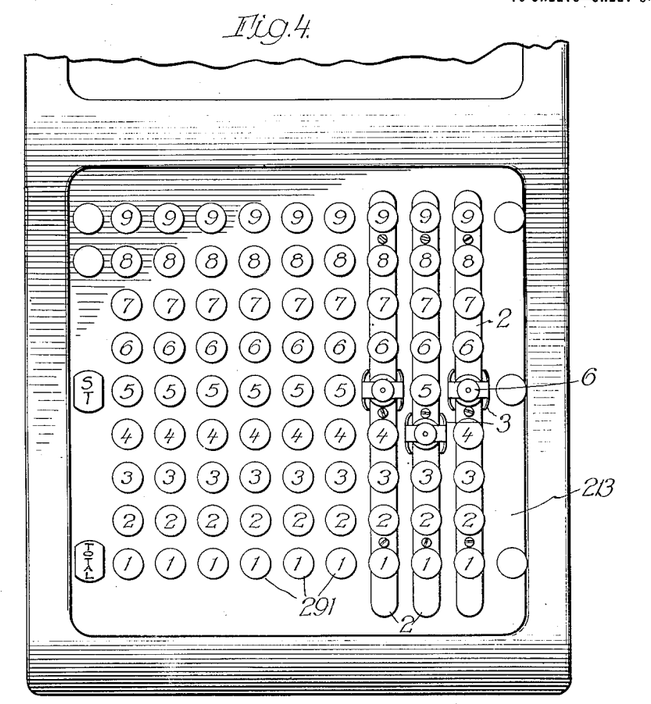
Fig. 4 is a top plan view of the front portion of the machine.
Figure 5:
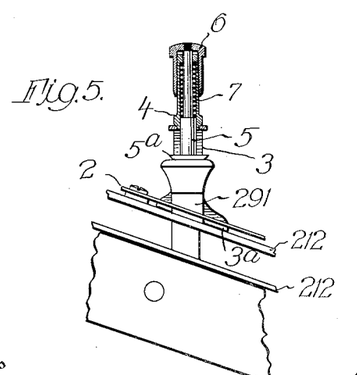
Fig. 5 is a detail sectional elevation showing one of the key-depressing attachments appearing in plan view in Fig. 4.
Figure 6:
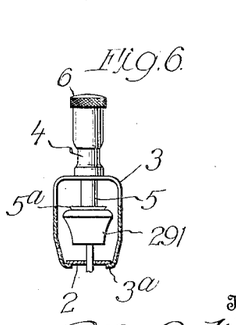
Fig. 6 is a cross sectional front elevation of the same device.

The machine proper requires no special description, in view of the fact that it appears in numerous prior patents and is extensively upon the market, though certain familiar parts thereof will be referred to in order that the coöperation of new parts supplied by my invention may be thoroughly understood. The amount keys 291 are arranged as usual to set stops for the rack 610, and they coöperate in the familiar manner with detent slide strips 214, the latter being released and restored as usual by the cross-rod 219 of a vibrating bail. Referring first to the attachments for selecting and applying pressure to amount keys representing the constant (Figs. 4 to 6) I secure to the upper keyboard plate 213 a number of guide strips 2, one for each row of keys from which selecting may be made for the constant,—in the present instance the three rows at the right. Each of these strips is slotted around the key stems and sufficiently spaced from the keyboard plate 213 to accommodate certain portions of the pressure-applying attachment. This comprises an upright yoke 3 whose side pieces are widened at their lower ends and formed with flanges 3ª to extend under the guide plate as clearly illustrated in Fig. 6. The yoke is wide enough and high enough to pass freely over the keys when slid along the guide plate. There is secured to the cross-piece of the yoke an upstanding barrel 4 in which slides the stem 5 of a plunger whose head 5ª is adapted to engage the key top to depress the key. A reduced portion of the stem extends through the head of the barrel and there is screwed to this stem a cap piece 6 which surrounds the barrel and serves as a handle or finger piece by which to manipulate the pressure attachment. A coiled spring 7 surrounds the reduced portion of the stem within the barrel as clearly shown in Fig. 5 and exerts a pressure constantly tending to thrust the plunger down upon the key top.

Obviously with one of the above-described attachments mounted upon each of the guide strips here shown selection can be made at will among the amount keys making up the three right-hand rows according to what constant may be called for. With the pressure-applying attachments set over selected keys and the plungers released it is clear that these keys will be set down the same as when in ordinary use of an adding machine finger pressure is applied to keys, and an operation of the machine will result in registering upon the regular wheels 920 an amount corresponding with the numerals of the selected keys. It will furthermore be seen that if the machine should be permitted to operate in the ordinary manner which involves advance and retreat of the bail cross-rod 219, the keys will be forcibly restored against the pressure of the spring 7 and then again depressed by said springs. It will be understood, however, from what was outlined in the beginning as to the character of the present invention that for the purposes thereof the said springs 7 must be restrained while a blank operation of the machine is executed and also during the ensuing total printing operation thereof, though such springs may be released and in fact are released as the total printing operation of the machine concludes, in order that an ensuing operation of the machine may again register the constant.

Figure 1:
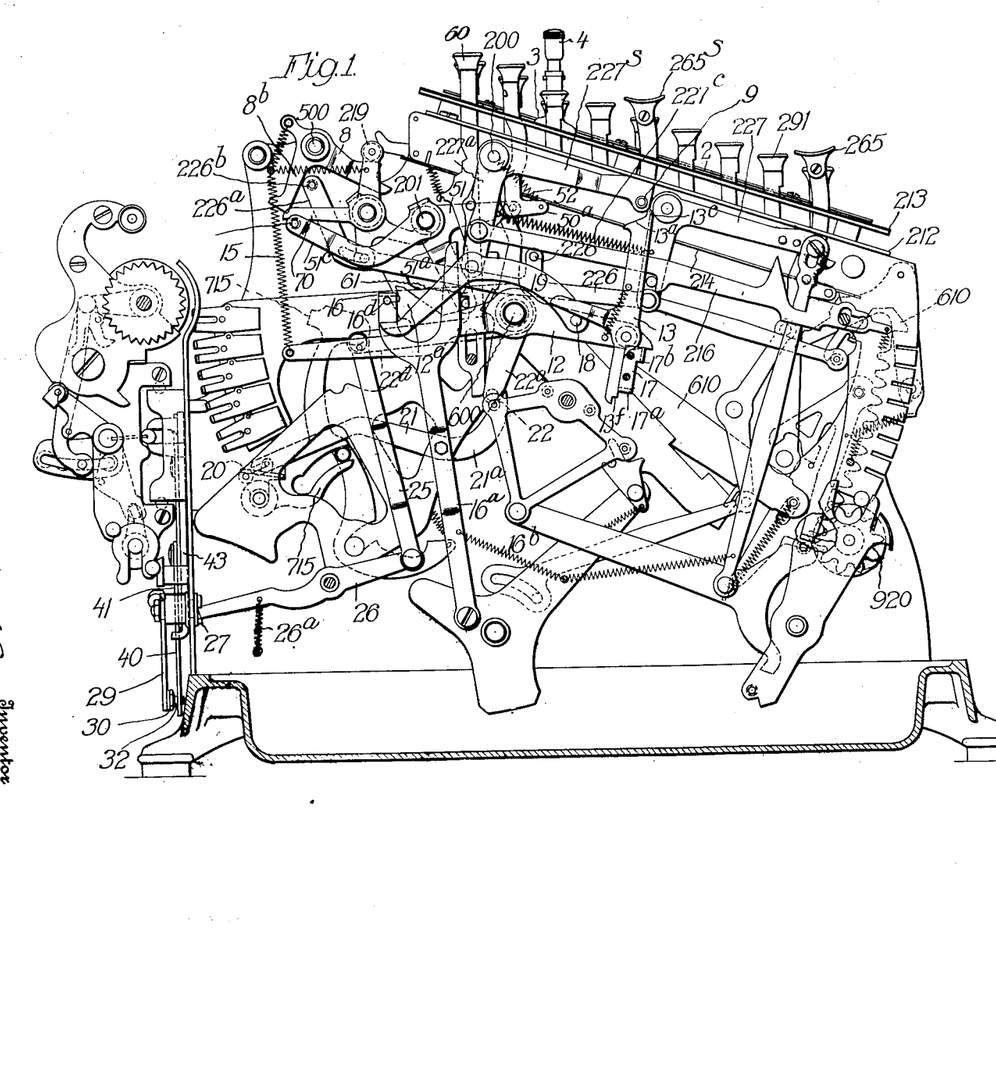
Figure 1 represents in left side elevation a Burroughs machine equipped with mechanism for carrying out the present invention.
Figure 7:
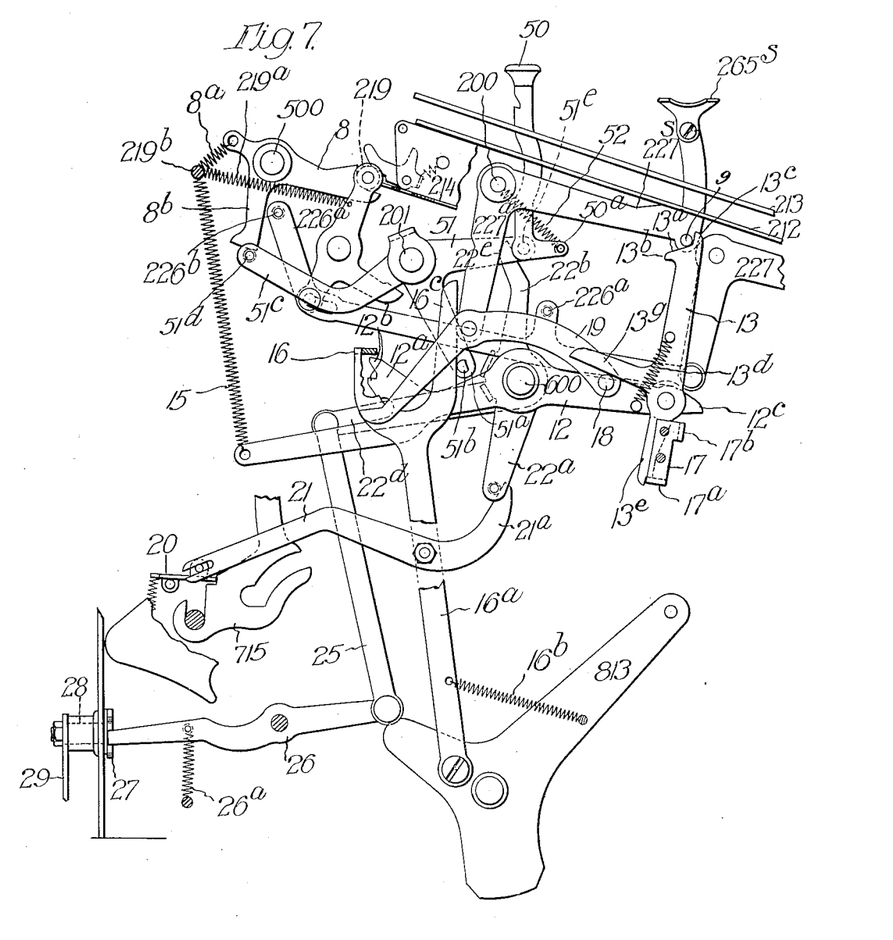
Fig. 7 is a view on the order of Fig. 1 showing relationship of parts at the conclusion of an adding operation.

The restraint of the springs 7 is effected through the medium of the bail cross-rod 219. Thus when the latter has been swung forward through the familiar instrumentalities including the wiper pawl 623 (Fig. 2), it is held forward in opposition to its retracting spring 219ª by a locking piece or latch 8 pivoted upon a convenient shaft, to-wit, the shaft 500 which carries the upper ribbon holder of the machine proper. This latch is impelled upward as to its forward arm by a spring 8ª applied to a short rearwardly-extending arm, and normally its raised portion in rear of its acting shoulder bears up against the bail cross-rod 219 as shown in Fig. 1. However, when the bail cross-rod swings forward past the latch shoulder the latter springs up behind said rod as illustrated in Fig. 7 and blocks its rear movement. It will be recalled that Fig. 7 illustrates the condition at the conclusion of an adding operation.

Figure 8:
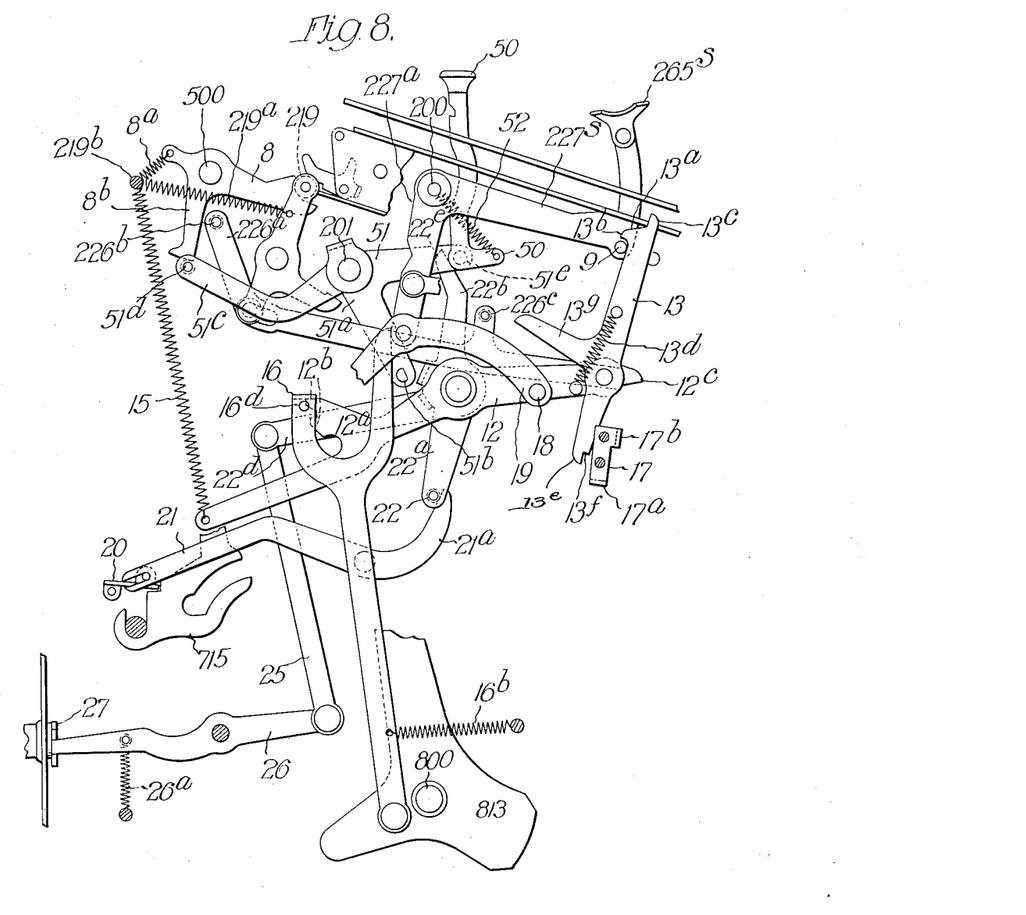
Fig. 8 is a similar view illustrating the relationship of parts at the middle of a blank operation.

In the operation above described there is preparatory action of the mechanism which in the next ensuing operation sets the totaling devices. The latter comprise the familiar total and subtotal keys 265 and 265$^s$ surmounting upstanding branches of forwardly-extending arms of bell cranks 227 and 227$^s$. The latter is slightly modified for the purposes of the present invention by mounting a laterally-projecting stud 9 at its forward end. A grappling device, presently to be pointed out, is adapted, in successive operations of the machine following the adding operation, to lay hold of this stud and pull down the subtotal key with the same effect as the putting down of said key by finger pressure. The grappling device is in the form of a three-armed piece pivotally mounted at the forward end of a lever 12 pivoted upon the familiar shaft 600 of the machine. The upwardly-extending arm 13 of said grappling piece has an inclined upper edge 13$^a$ constituting at its lower rear portion the back of a hook 13$^b$ and at its front portion merging into the rear side of a short extension 13$^c$ of this arm of the grappling piece. Normally the said inclined edge 13$^a$ stands a distance below the stud 9 as shown in Fig. 1 but as a result of an adding operation of the machine the grappling device is moved up so that the said inclined edge is immediately under the stud and the extension 13$^c$ is in front of the stud as illustrated in Fig. 7. A spring 13$^d$ connecting the arm 13 of the grappling piece with the lever 12 holds said arm rearward but in the first part of the blank operation of the machine the grappling device is forced farther upward and the said spring yields while the inclined edge 13$^a$ cams past the stud 9, the hook 13$^b$ then springing over the stud as illustrated in Fig. 8. Then at the conclusion of this operation when the regular interlocking devices between the total keys and the full stroke sector 311 permit it, the grappling hook will pull down the subtotal key. The power for the purpose is supplied by a relatively strong spring 15 which connects the rear extremity of the lever 12 with the same frame cross-rod to which the springs 8$^a$ and 219$^a$ are anchored. Obviously, when the machine is then again operated the effect will be the same as that of depressing the subtotal key by hand and operating the machine for an ordinary subtotal printing performance.

Turning next to the mechanism whereby the step-by-step action of the lever 12 is produced for first moving the grappling hook up under the stud 9 and then taking it over that stud, the said lever is formed with an upward extension or branch 12$^a$ on its rear arm and this branch constitutes a ratchet, its rear portion comprising two ratchet teeth 12$^b$. To coöperate with this ratchet for the imparting of step-by-step movement to the lever 12 there is supplied a pawl in the form of a laterally-turned end portion 16 of the rear branch of the bifurcated upper part of a pitman 16$^a$ which reciprocates in every operation of the machine. To this end the said pitman is coupled at its lower extremity to the familiar vibrating lever 813 of the machine proper and it is connected to a frame-stud by a spring 16$^b$ which tends to engage the pawl 16 with the ratchet. Normally as illustrated in Fig. 1 the pawl is over the lower tooth of the ratchet ready to operate thereon and rock the lever 12 when the pitman is lowered during the first half cycle of an operation of the machine. In the last half cycle of such operation the pitman is lifted and the pawl wipes upwardly past the upper tooth of the ratchet and assumes a position above the same as illustrated in Fig. 7 ready to act upon this upper tooth and further rock the lever 12 in the first half cycle of the next ensuing operation of the machine as illustrated in Fig. 8.

Figure 9:
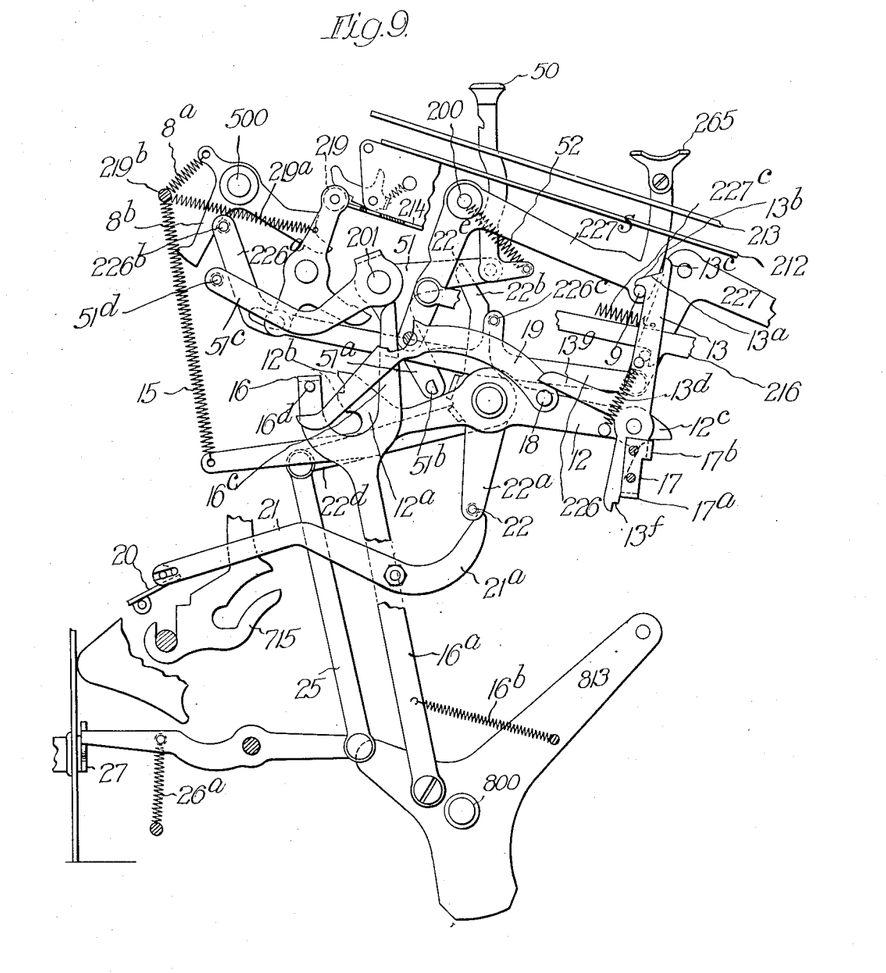
Fig. 9 is a similar view illustrating the relationship of parts at the conclusion of a blank operation.

The lever 12 is detained in the intermediate position by the co-action of the grappling piece as a catch or detent with a fixture upon the machine frame, as illustrated in Fig. 7. Thus a lower branch 13$^e$ of the grappling piece is shouldered as shown at 13$^f$ and there is secured to the right side frame piece of the machine a small bracket 17 having a laterally-turned lower portion 17$^a$ supplying a shoulder over which the shoulder 13$^f$ will engage under actuation of the spring 13$^d$. When the lever 12 is further rocked the camming effect between the inclined edge 13$^a$ and the stud 9 swings the grappling piece upon its pivot to such extent as to throw the shoulder 13$^f$ out of alinement with the bracket shoulder 17$^a$ and when the hook 13$^b$ passes the stud 9 the engagement of the latter with the rear edge of the arm 13 below the hook prevents said arm swinging back far enough to re-aline the shoulder 13$^f$ with the shoulder 17$^a$. Consequently when the subtotal key is released by the before-mentioned familiar interlocking devices the spring 15 is permitted to rock the lever 12 back to its normal position as illustrated in Fig. 9. A forwardly-projecting end portion 12$^c$ of the lever 12 serves to limit the throw of the lever by engaging a laterally-turned portion 17$^b$ of the bracket 17.

In order that the lever 12 may take its full stroke under actuation of the spring 15 and in order that the pawl 16 may re-assume a position for eventual coöperation again with the lower tooth of the ratchet, it is necessary that said pawl be displaced from over the upper tooth. This is provided for by having the downwardly-extending arm of the bell crank 227ª engage the front edge of the forward branch 16ᶜ of the pitman. Thus as the subtotal key bell crank lever 227ª is rocked by the grappling device its said depending arm will act against the pitman and throw its upper end rearward to the position illustrated in Fig. 9 thereby taking the pawl 16 from over the upper ratchet tooth which then moves above said pawl so that at the conclusion of the next operation of the machine when the subtotal key is released and rises under actuation of its own spring 227ᶜ said pawl may move in over the lower tooth of the ratchet.

Figure 10:
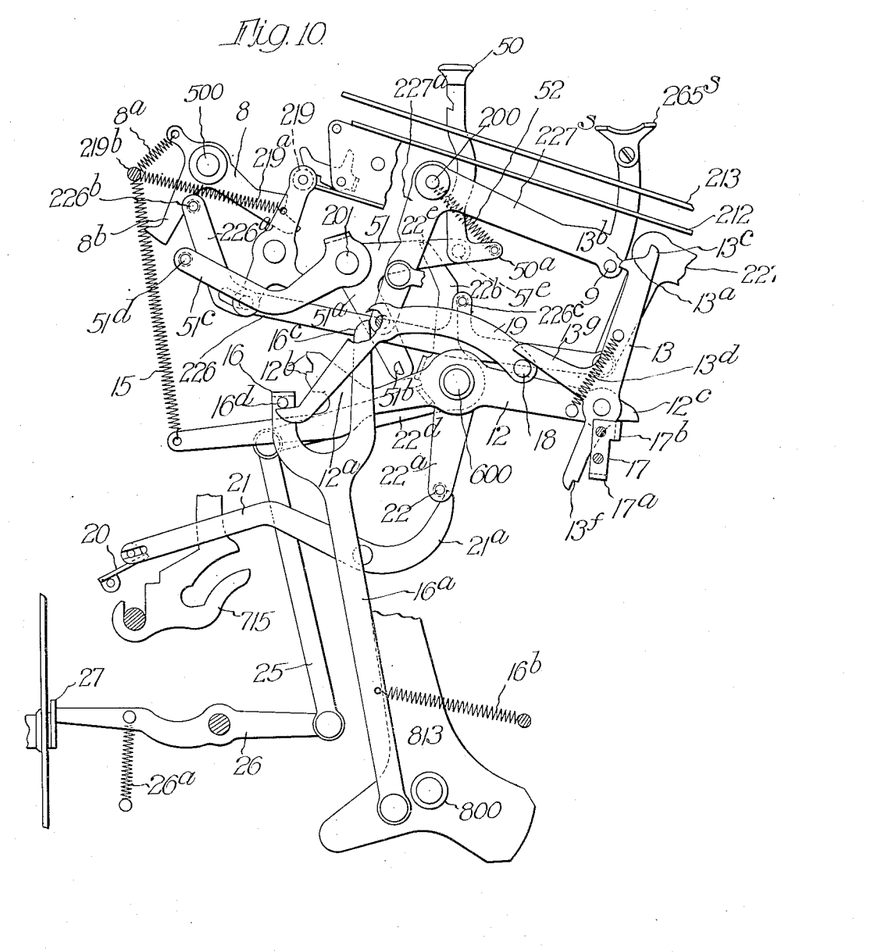
Fig. 10 is another similar view illustrating the condition at the end of the first half cycle of the total printing operation.

Referring next to the matter of release of the subtotal key from the grappling device during the subtotaling operation, said device for this purpose has a rearwardly-extending arm 13ᵍ which overlies a stud 18 at the forward end of a lever 19 pivoted upon the depending arm of the subtotal key bell crank lever and having a rearwardly-extending arm underlying a stud 16ᵈ on the rear branch of the upper part of the pitman 16ª. When the subtotal key lever is rocked by the grappling device this lever 19 is swung back with the depending arm of the bell crank 227ª so that it accompanies the upper end of the pitman 16ª when the latter is thrown rearward as above described by said arm of the bell crank. Consequently the extremity of the rear arm of said lever 19 remains under the stud 16ᵈ and as the pitman lowers in the first half cycle of the subtotaling operation said stud rocks the lever 19 and the latter's stud 18 operates upon the arm 13ᵍ of the grappling device and disengages the hook of the latter from the stud 9. The grappling hook pulls the subtotal key down far enough to permit a slight rise of the key before it is released by the interlocking devices before mentioned (Fig. 10),—this in order to prevent reëngagement of the hook of the grappling device over the stud 9. The result is that as the last half of the operation begins (following the disengagement of the grappling hook from the said stud during the first half of the operation) the end of the hook will strike against the stud 9. Then at the end of the operation the interlocking devices release the subtotal key and it rises to its normal position.

Referring next to the release of the bail 219 and consequent removal of restraint of springs 7, so that they may again depress the underlying keys and provide for registering the constant in the operation of the machine next ensuing after the total printing operation, this release is effected through the medium of the totaling devices. Numeral 226 designates the familiar link which connects the grand total key bell crank lever 227 with the releasing bail. For the purposes of the release now under discussion said link is formed with a rearward and upward extension 226ª and the latch 8 is formed with a downwardly-extending branch 8ᵇ designed to be acted upon by a stud 226ᵇ carried by said extension 226ª. Normally the stud 226ᵇ stands forward of the latch arm 8ᵇ as shown in Fig. 1 so as to permit the latch to swing up into engagement with the release bail cross-rod 219 as shown in Fig. 7. When the subtotal key is pulled down the total key is likewise rocked through the medium of the familiar link 216, and the link 226 is correspondingly thrust rearward. This causes the stud 226ᵇ to act upon the forward edge of the latch arm and disengage the latch from the bail cross-rod 219, as illustrated in Fig. 9, whereupon when the total key restores, the cross rod retreats and the springs 17 depress the underlying keys.

Referring next to the matter of preventing the printing mechanism from operating except when the progressive numbers are to be printed, I employ a locking comb 20 similar to that designated M⁶ in Patent No. 1,016,276, issued February 6, 1912, upon the invention of William J. Kilpatrick, said comb adapted to engage behind shoulders of the printing hammers 715 as in said patent. In the present instance, the comb is coupled to the long arm of a lever 21, which is pivoted intermediate its ends upon a stud carried by the left side piece of the fixed frame in which the printing hammers are mounted. The weight of this long arm coupled with the weight of the plate itself effects a normal engagement of the plate with said shoulders so that the hammers are blocked. An upturned forward arm 21ª of said lever extends in front of a stud 22 on a depending arm 22ª of a three-armed rocking piece journaled on the shaft 600 and having an upstanding branch or arm 22ᵇ adapted to be acted upon by a stud 226ᶜ in an upstanding branch of the link 226. Thus, when the total keys are operated in the manner above described this stud acts against the arm 22ᵇ rocking it rearward and rocking the depending arm 22ª forward whereby the long arm 21 of the aforesaid lever is raised and the comb plate 20 swung upward out of line with the hammer shoulders. The hammers are thus unblocked so as to be ready for printing the progressing total or subtotal in the next ensuing operation. When that is over the total keys have returned to normal and consequently the hammers again become blocked. The hammers remain blocked during the adding of the constant and also during the blank operation though as to the latter this would not be necessary since there would be no release of hammers in such an operation, according to the law of the machine proper.

Figures 12, 13:
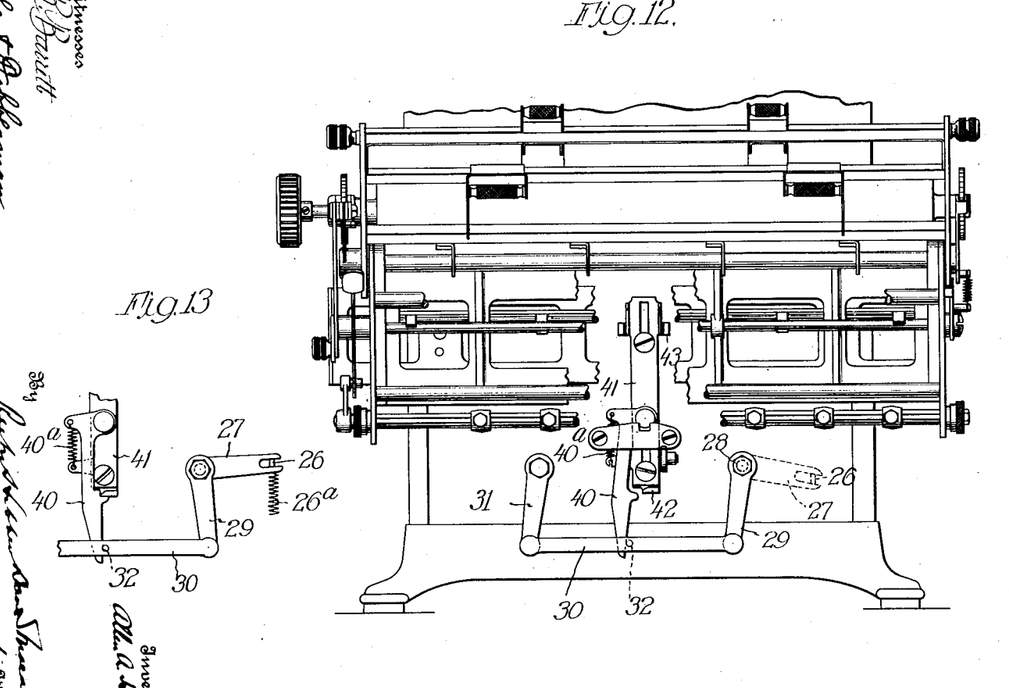
Fig. 12 is a rear elevation of the machine with some portions thereof broken out.
Fig. 13 is a rear elevation of some of the parts shown in Fig. 12, illustrating a different relationship thereof.

Referring next to the matter of disabling the line-spacing mechanism in order that the progressing amounts may be listed in a compact column, the aforesaid three-armed structure serves in this connection also through the medium of its rearwardly-extending branch or arm $22^d$. The latter is connected by a link 25 with the forward arm of a lever 26 whose rear arm controls a line-space coupling device of familiar character. Referring to Fig. 12 the said rear arm of the lever 26 engages the bifurcation of an arm 27 secured to a short rock shaft 28 journaled in the back panel of the machine. A radius link 29 is fastened to said rock shaft and connected by a horizontal link 30 with a similar link 31. A stud 32 on said horizontal link engages a coupler dog 40 which is part of the line-spacing mechanism. Thus, this dog is pivoted to a vertically-reciprocating slide 41 and is adapted to engage under a flange or lip 42 of another vertically-reciprocating slide 43. The two slides are as usual slotted and mounted upon the back panel of the machine and provided at their upper ends with jaws to embrace the line space bail. A spring $26^a$ normally holds down the rear arm of the lever 26 with the result that the coupler dog is held away from the lip or flange 42 in opposition to the spring $40^a$ applied to said dog. Consequently no line spacing occurs in either the operation which adds the constant or the following blank operation. However, in the totaling operation line spacing does occur by reason of the fact that the rocking of the three-armed piece (already explained as being an incident to the setting of the total device) involves downward movement of the branch $22^d$ and consequently upward movement of the rear arm of the lever 26 and release of the coupler dog.

The above-described coupling and uncoupling arrangement *per se* for the line-spacing mechanism is now old and well-known being disclosed in several prior patents e. g. Patent No. 1,084,591 issued January 13, 1914, on the invention of Russell E. Benner.

In the interest of making the machine available to the user for a great variety of purposes, it is desirable to provide for converting it at will into a simple adding and listing machine. To this end I supply a special key whose depression will disable all of the above-described devices for effecting the automatic production of the progressive table, except the attachments for putting pressure upon the keys and these can be readily removed by sliding them off the ends of their guide plates.

The said special key is designated 50 and is arranged at the upper left-hand corner of the keyboard to slide through slots in the plates 213 and 212 and also have a slight rocking movement to enable its notch to be engaged with the upper keyboard plate when the key is depressed so that it will not be necessary to maintain pressure upon this key. The stem of the latter is pivoted to the forwardly-extending arm 51 of a three-armed rocker piece and such stem preferably has a forward branch $50^a$ connected by a spring 52 with a rock shaft 200 so that the latching down of the key will take place automatically. The said three-armed rocker piece is journaled upon a frame cross-rod 201 and has a depending arm $51^a$ with a stud $51^b$ to coact with the branch $16^c$ of the pitman $16^a$, and a rearwardly-extending arm $51^c$ with a stud $51^d$ to coact with the depending arm $8^b$ of the latch 8. The pivot stud $51^e$ which connects the forwardly-extending arm 51 of the rocker piece with the stem of the key 50, projects inwardly far enough to act upon a cam finger $22^e$ which is an extension of the arm or branch $22^b$ of the other three-armed rocker piece hereinbefore described.

Figure 11:
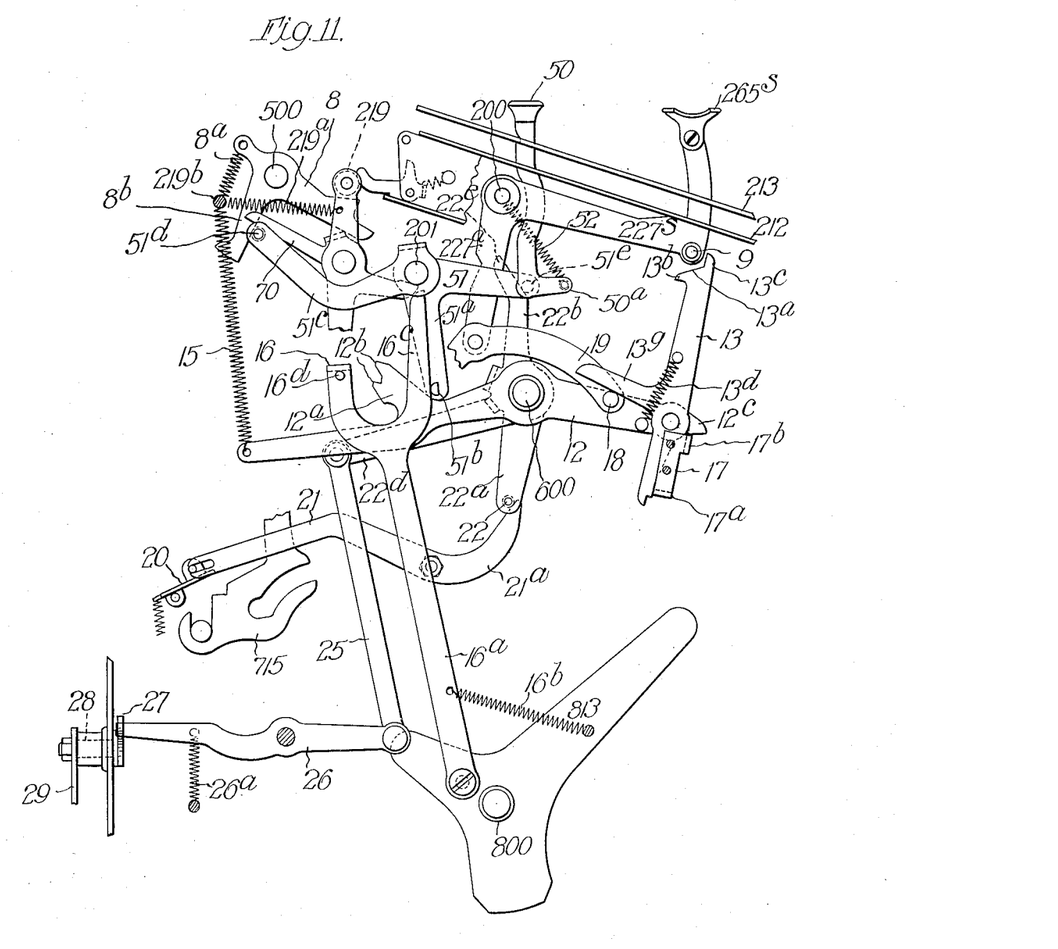
Fig. 11 is a similar view illustrating the effect of putting down a special key which converts the machine into a simple adding and listing machine.

When the key 50 is put down the stud $51^e$ acts upon said cam finger and rocks the last-mentioned piece sufficiently to cause the lever 21 to lift the hammer-blocking comb plate 20 as shown in Fig. 11. This action also results in operating the lever 26 to permit coupling up of the line space devices. The rocking of the other three-armed piece by the depression of said key causes its stud $51^b$ to act against the pitman branch $16^c$ and swing the pawl 16 rearwardly away from the ratchet teeth $12^b$. At the same time the stud $51^d$ is swung up in front of the arm $8^b$ of the latch 8 so as to prevent the latter from engaging the bail cross-rod 219.

The aforesaid stud $51^d$ serves another purpose, namely, that of preventing an inopportune use of the key 50, as for instance immediately following an operation of the machine for adding a constant. Thus as illustrated in Fig. 7 the swinging of the latch 8 into engagement with the release bail cross-rod 219 results in a slightly widened end portion or foot of the latch arm $8^b$ moving over said stud and thereby blocking the key. It will be understood that the before-mentioned spring 52 besides serving the function of automatically latching down the key also serves to restore said key to normal position when it is unlatched. The upward movement of the key and corresponding return swing of the three-armed rocker piece are conveniently limited by abutment of the square side of the stud 51$^b$ against the stem 60 of the familiar elimination key, and said stem is in the present instance formed with a lug 61 (Fig. 1) to engage over said stud for the purpose of preventing depression of the elimination key except when the so-called "normal" key 50 is in action.

Figure 14:
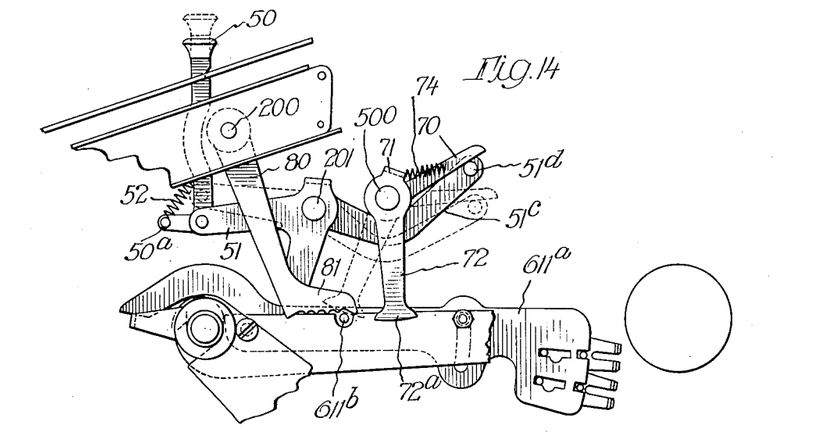
Fig. 14 is a fragmentary right side elevation of the machine illustrating the special type carrier and disabling means therefor controlled by said special key.

The machine is equipped with a special type carrier 611$^a$ (Fig. 14) of familiar character, for the purpose of printing signs to distinguish totals, subtotals and eliminated or non-added items from added items, but as no such special printing would be desirable in connection with a progressive table, I provide for disabling this special type carrier except when the said normal key is down. Thus the before-mentioned stud 51$^d$ extends under an arm 70 of a yoke 71 which is journaled upon the release bail rock shaft and at the right-hand side of the machine (Fig. 14) has a depending arm 72 with a widened lower end or foot 72$^a$ for coöperation with a stud 611$^b$ of the special type carrier. As illustrated by the full lines in Fig. 14 said arm 72 is rearward when the special key 50 is down and consequently does not interfere with the action of the special type carrier. However, when the key is up as shown by dotted lines in Fig. 14 said arm 72 assumes a forward position under actuation of a spring 74 applied to the yoke 71, and in such position stands over the said stud 611$^b$ thus blocking the special type carrier.

Figure 15:
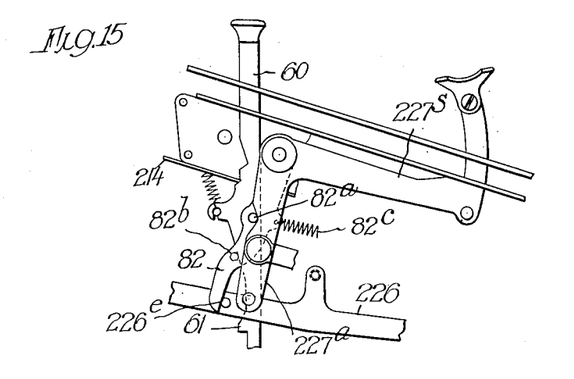
Fig. 15 is a corresponding left side elevation illustrating special type carrier setting means.
Figure 16:
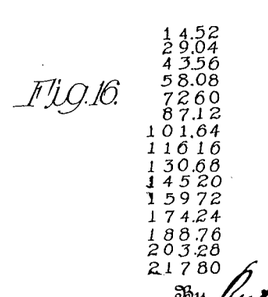
Fig. 16 shows an example of work.

When the key 50 is down the differential setting of the special type carrier is brought about in a familiar manner. Thus a swinging arm 80, having a notched foot 81, coöperates with the stud 611$^b$ of the special type carrier, the extent of movement of the latter being regulated by the setting of the arm 80 under control of the total, subtotal and elimination keys. Thus said arm 80 is secured to the rock shaft 200 which at the left-hand side of the machine has a depending arm 82 (Fig. 15) which coöperates with a stud 226$^e$ of the total key link 226 and is equipped with studs 82$^a$ and 82$^b$ to coöperate respectively with the subtotal key bell crank lever 227$^a$ and a cam 60$^c$ on the elimination key stem. A spring 82$^c$ normally holds the arm 82 forward.

Referring next to the manner of driving the machine, it is here shown arranged for either hand or power operation. When motor driven it is desirable that the user be relieved of the necessity for maintaining hand pressure upon the starting bar and I have so modified the familiar control devices for the motor as to provide for this. It will be unnecessary to describe in detail the control devices proper since the same are fully disclosed in prior patents and in use on numerous machines on the market.

Reference may be had to Patent No. 866,750 issued September 24, 1907, on the invention of Jesse G. Vincent which illustrates this standard control equipment of a Burroughs adding machine. As fully explained in that patent and as well understood by those skilled in the art the machine may be caused to run continuously, or to automatically execute operation after operation by simply maintaining hand pressure upon the starting bar 90 (Fig. 2),—this by reason of the fact that the spring 92 is kept under tension and consequently when the roller stud 311$^a$ on the full stroke sector has forced down the bar 93 and thrown the starting stud back into the path of the arm of the clutch-controlling device (as fully explained in the said Vincent patent) and the said full stroke sector then executes its return movement the said bar 93 will rise and continue to follow the stud 311$^a$ so as to again remove the starting stud from the path of the said arm of the clutch-controlling device. I provide for this same automatic succession in operations without necessitating continued depression of the bar 90. I take advantage of the excessive downward movement imparted to the bar 93 by the stud 311$^a$ and consequent excessive tensioning of the spring 92, to effect automatic release of the clutch-operating means by reason of holding said spring under such excessive tensioning until the stud 311$^a$ has swung up considerably away from the abutment branch 93$^a$ of the bar and then releasing the latter so that it will be thrown upward with such momentum as not to be checked by the encounter of the bottom of its slot 93$^b$ with the stud 90$^a$ of the starting bar lever 90$^b$. I have found in practice that this action can be relied upon to reset the clutch and cause successive operations of the machine to take place automatically, the power of the spring 92 being such as to overcome the spring 95 which as usual connects the starting bar lever 90$^b$ with the other starting bar lever 90$^c$.

Figure 2:
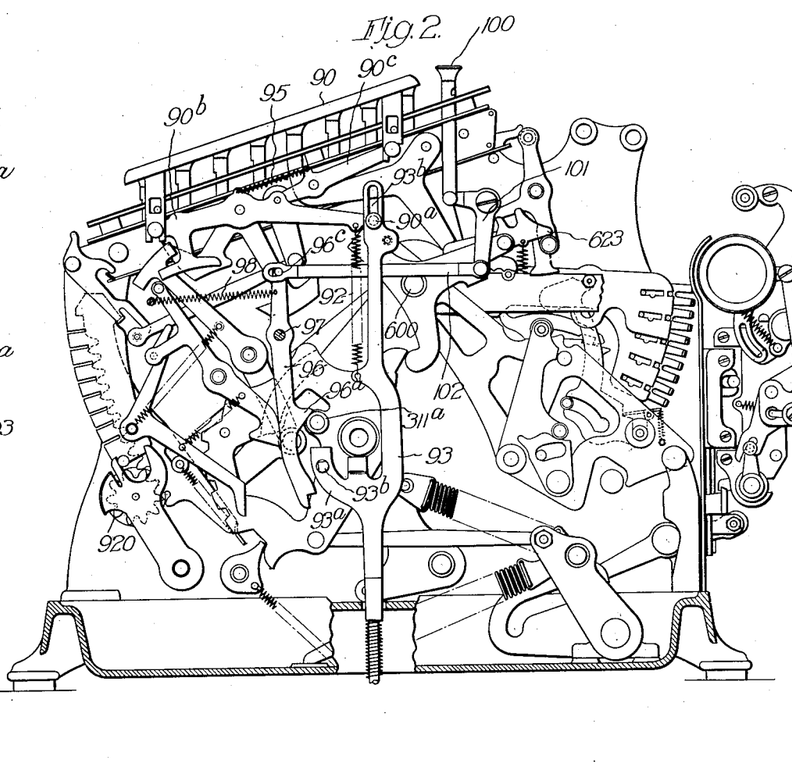
Fig. 2 is a right side elevation of the machine.
Figure 3:
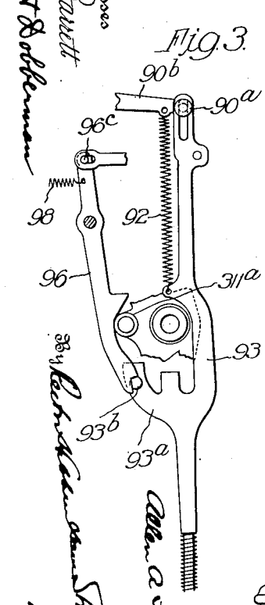
Fig. 3 is a detail left side elevation showing certain of the parts which appear in Fig. 2 differently conditioned.

The means here shown for carrying out the above-described modified action of the motor control devices comprise a stud 93$^b$ fastened in the abutment branch 93$^a$ of the bar 93, and a latch lever 96 notched at its lower end to engage the said stud and formed higher up with a cam lug 96$^a$ to coöperate with the roller stud 311$^a$. The latch lever is pivoted upon a frame stud 97 and a spring 98 is applied to its upper arm so as to enforce engagement of the cam lug 96$^a$ with the roller stud 311$^a$ and tend to engage the notched lower end of the lever 96 with the stud 93$^c$. Normally the roller stud 311$^a$ holds the latch lever off through engagement with the high part of the cam lug as shown in Fig. 2. However, when the roller stud 311$^a$ swings down upon inauguration of a series of operations by depression of the starting bar 90, the latch lever swings rearward and when the bar 93 has been forced down by the roller stud about to the limit of its movement, the said lever becomes engaged with the stud 93ᶜ as shown in Fig. 3. This engagement keeps the spring 92 under considerable tension as the full stroke sector 311 makes its return stroke and until at the close of such return stroke the roller stud 311ᵃ in riding up the cam lug 96ᵃ disengages the latch lever 96 from the stud 93ᶜ. Thereupon the bar 93 springs upward with considerable force and the result above explained comes about so that the inaugural operation of the machine is immediately followed by another and so on indefinitely.

Of course this equipment for effecting successive operations of the machine as motor driven, without maintaining pressure upon the starting bar 90, should be disabled when the machine is in use in the ordinary way as an adding and listing machine. Therefore, I provide another special key 100 (Fig. 2) whose stem is pivotally connected to a bell crank lever 101, the latter being connected to a link 102 which is slotted at its forward end to embrace a stud 96ᶜ on the upper arm of the latch lever 96. When the key is up as shown in Fig. 2 the slot permits the latch lever to perform its function in the manner already described. However when the key is put down the front end of the slot of the link is brought up to the stud 96ᶜ and the latch lever is blocked. The stem of the key 100 is notched in the familiar manner to provide for latching it down.

The above-mentioned Vincent Patent No. 866,750 also discloses the interlocking devices hereinbefore referred to as commonly used between the totaling devices of these machines and the prime mover thereof. Similar interlocking devices appear in Fig. 2, the same comprising a rock shaft 1400 operatively connected with the total key, an arm 1400ᵃ secured to said rock shaft, a roller stud 1400ᵇ upon said arm, and a flange or rib 311ᵇ upon the full stroke sector. It will be understood that these devices serve to prevent use of the total keys after an operation of the machine is started and until such operation is over, and vice versa, prevent an operation of the machine while the totaling devices are being set.

I claim:

1. In a machine of the class described the combination of registering wheels; type-carrying actuators therefor; keys supplying stops to variously measure movements of actuators; settable means for repeatedly depressing keys; means for positioning the actuators under control of the wheels for the printing of a total; a prime mover; and means for setting the last-mentioned means thereby in automatic succession to operation of the wheel actuators under control of the key stops, with provisions for restraining the aforesaid key-depressing means during the totaling operation.

2. In a machine of the class described the combination of registering wheels; reciprocating type-carrying actuators therefor; means for engaging and disengaging the wheels and actuators; keys supplying stops to measure movements of the latter; settable means for repeatedly depressing keys; means for keeping the wheels and actuators engaged during movement of the latter in both directions as controlled in extent by backward rotation of wheels to zero for subtotaling purposes; a prime mover; and means for setting the last-mentioned means thereby in automatic succession to operation of the wheel actuators under control of the key stops, with provisions for restraining the aforesaid key-depressing means during the totaling operation.

3. In a machine of the class described the combination of registering wheels; reciprocating type-carrying actuators therefor; carrying mechanism including trip pawls serving also as zero stops; means for engaging and disengaging the wheels and actuators; keys supplying stops to measure movements of the latter; settable means for repeatedly depressing keys; means for keeping the wheels and actuators engaged during movement of the latter in both directions as controlled in extent by backward rotation of wheels to zero for subtotaling purposes; a prime mover; and means for setting the last-mentioned means in an operation of the prime mover immediately succeeding one wherein the actuators are under control of the key stops and restraining the key-depressing means during such operation and during the next operation of the prime mover which effects the totaling.

4. In a machine of the class described the combination of registering wheels; type-carrying actuators therefor; keys supplying stops to variously measure movements of actuators; settable means for repeatedly depressing keys; means for positioning the actuators under control of the wheels for the printing of a total; printing mechanism; a prime mover; and means for setting the last-mentioned means thereby in automatic succession to operation of the wheel actuators under control of the key stops, with provisions for restraining the aforesaid key-depressing means during the totaling operation and for automatically disabling the printing mechanism in a preceding operation.

5. In a machine of the class described the combination of registering wheels; reciprocating type-carrying actuators therefor; carrying mechanism including trip pawls serving also as zero stops; means for engaging and disengaging the wheels and actuators; keys supplying stops to measure movements of the latter; settable means for repeatedly depressing keys; means for keeping the wheels and actuators engaged during movement of the latter in both directions as controlled in extent by backward rotation of wheels to zero for subtotaling purposes; a prime mover; means for setting the last-mentioned means in an operation of the prime mover immediately succeeding one wherein the actuators are under control of the key stops and restraining the key-depressing means during such operation and during the next operation of the prime mover which effects the totaling; printing mechanism; and means for automatically disabling it during the first of said three operations of the prime mover and enabling said mechanism for the third of said operations.

6. In a machine of the class described the combination of registering wheels; type-carrying actuators therefor; keys supplying stops to variously measure movements of actuators; settable means for repeatedly depressing keys; means for positioning the actuators under control of the wheels for the printing of a total; printing mechanism; a prime mover; means for setting the last-mentioned means thereby in automatic succession to operation of the wheel actuators under control of the key stops, with provisions for restraining the aforesaid key-depressing means during the totaling operation and for automatically disabling the printing mechanism in a preceding operation; line-spacing mechanism; and means for disabling it in all but one of said operations of the prime mover.

7. In a machine of the class described the combination of registering wheels; reciprocating type-carrying actuators therefor; carrying mechanism including trip pawls serving also as zero stops; means for engaging and disengaging the wheels and actuators; keys supplying stops to measure movements of the latter; settable means for repeatedly depressing keys; means for keeping the wheels and actuators engaged during movement of the latter in both directions as controlled in extent by backward rotation of wheels to zero for subtotaling purposes; a prime mover; means for setting the last-mentioned means in an operation of the prime mover immediately succeeding one wherein the actuators are under control of the key stops and restraining the key-depressing means during such operation and during the next operation of the prime mover which effects the totaling; printing mechanism; means for automatically disabling it during the first of said three operations of the prime mover and enabling said mechanism for the third of said operations; line-spacing mechanism; and means for disabling it in all but one of said three operations.

8. In a machine of the class described the combination of registering wheels; type-carrying actuators therefor; keys supplying stops to variously measure movements of actuators; settable means for repeatedly depressing keys; means for releasing and restoring depressed keys; means for positioning the actuators under control of the wheels for the printing of a total; a prime mover; means for setting the last-mentioned means thereby in automatic successions to operation of the wheel actuators under control of the key stops, with provisions for locking the key releasing and restoring means in operated position and thereby restraining the aforesaid key-depressing means during the totaling operation.

9. In a machine of the class desrcibed the combination of registering wheels; type-carrying actuators therefor; keys supplying stops to variously measure movements of actuators; settable means for repeatedly depressing keys; a key releasing and restoring bail; means for positioning the actuators under control of the wheels for the printing of a total; a prime mover; means for setting the last-mentioned means thereby in automatic succession to operation of the wheel actuators under control of the key stops; a spring-actuated latch for the key-releasing bail; and means for displacing the latch by the last-mentioned means.

10. In a machine of the class described the combination of registering wheels; reciprocating type-carrying actuators therefor; means for engaging and disengaging the wheels and actuators; keys supplying stops to measure movements of the latter; settable means for repeatedly depressing keys; means for keeping the wheels and actuators engaged during movement of the latter in both directions as controlled in extent by backward rotation of wheels to zero for subtotaling purposes; a prime mover; a reciprocating element operatively connected with the prime mover; and devices actuated step-by-step thereby for setting the last-specified means.

11. In a machine of the class described the combination of registering wheels; reciprocating type-carrying actuators therefor; means for engaging and disengaging the wheels and actuators; keys supplying stops to measure movements of the latter; settable means for repeatedly depressing keys; means for keeping the wheels and actuators engaged during movement of the latter in both directions as controlled in extent by backward rotation of wheels to zero for subtotaling purposes; a prime mover; a reciprocating element operatively connected with the prime mover; and devices actuated step-by-step thereby for setting the last-specified means, the latter adapted to displace the reciprocating element and said element then operating to disconnect the said devices from the totaling means.

12. In a machine of the class described the combination of registering wheels; reciprocating type-carrying actuators therefor; carrying mechanism including trip pawls serving also as zero stops; means for engaging and disengaging the wheels and actuators; keys supplying stops to measure movements of the latter; settable means for repeatedly depressing keys; means for setting the last-mentioned means in an operation of the prime mover immediately succeeding one wherein the actuators are under control of the key stops and restraining the key-depressing means during such operation and during the next operation of the prime mover which effects the totaling; a prime mover; a reciprocating element operatively connected with the prime mover; and devices preliminarily actuated in the first of the above specified three operations of the prime mover and finally actuated in the second of said operations, for setting the last specified means to bring about a totaling effect in the third of said operations.

13. In a machine of the class described the combination of registering wheels; reciprocating type-carrying actuators therefor; carrying mechanism including trip pawls serving also as zero stops; means for engaging and disengaging the wheels and actuators; keys supplying stops to measure movements of the latter; settable means for repeatedly depressing keys; means for keeping the wheels and actuators engaged during movement of the latter in both directions as controlled in extent by backward rotation of wheels to zero for subtotaling purposes; a prime mover; a pawl operatively connected with the prime mover; a spring-actuated ratchet lever operated upon by said pawl; and a grappling device carried by said lever and adapted upon a second actuation thereof by the pawl, to lay hold of and set the last-specified means.

14. In a machine of the class described the combination of registering wheels; reciprocating type-carrying actuators therefor; carrying mechanism including trip pawls serving also as zero stops; means for engaging and disengaging the wheels and actuators; keys supplying stops to measure movements of the latter; settable means for repeatedly depressing keys; means for keeping the wheels and actuators engaged during movement of the latter in both directions as controlled in extent by backward rotation of wheels to zero for subtotaling purposes; a prime mover; a pivoted spring-held reciprocating pawl operatively connected with the prime mover; a spring-actuated ratchet lever operated upon by said pawl; and a grappling device carried by said lever and adapted to lay hold of and set the last specified means, the latter thereupon disengaging the pawl from the ratchet lever.

15. In a machine of the class described the combination of registering wheels; reciprocating type-carrying actuators therefor; carrying mechanism including trip pawls serving also as zero stops; means for engaging and disengaging the wheels and actuators; keys supplying stops to measure movements of the latter; settable means for repeatedly depressing keys; means for keeping the wheels and actuators engaged during movement of the latter in both directions as controlled in extent by backward rotation of wheels to zero for subtotaling purposes; a prime mover; a pivoted spring-held reciprocating pawl operatively connected with the prime mover; a spring-actuated ratchet lever operated upon by said pawl; a grappling device carried by said lever and adapted to lay hold of and set the last specified means, the latter thereupon disengaging the pawl from the ratchet lever; and a trip for the grappling device operated by the pawl when so disengaged.

16. In a machine of the class described the combination of registering wheels; reciprocating type-carrying actuators therefor; carrying mechanism including trip pawls serving also as zero stops; means for engaging and disengaging the wheels and actuators; keys supplying stops to measure movements of the latter; settable means for repeatedly depressing keys; means for keeping the wheels and actuators engaged during movement of the latter in both directions as controlled in extent by backward rotation of wheels to zero for subtotaling purposes; a prime mover; a pivoted spring-held reciprocating pawl operatively connected with the prime mover; a spring-actuated ratchet lever operated upon by said pawl; a grappling device in the form of a hook pivoted on said lever and spring-held and having a catch-arm; and a fixed catch piece for said arm to engage whereby the ratchet lever and the grappling device are maintained in an intermediate position in opposition to the lever-spring pending a second actuation of the lever by the pawl.

17. In a machine of the class described the combination of registering wheels; reciprocating type-carrying actuators therefor; carrying mechanism including trip pawls serving also as zero stops; means for engaging and disengaging the wheels and actuators; keys supplying stops to measure movements of the latter; settable means for repeatedly depressing keys; means for keeping the wheels and actuators engaged during movement of the latter in both directions as controlled in extent by backward rotation of wheels to zero for subtotaling purposes; a prime mover; a pivoted spring-held reciprocating pawl operatively connected with the prime mover; a spring-actuated ratchet lever operated upon by said pawl; a grappling device in the form of a hook pivoted on said lever and spring-held and having a catch-arm; and a fixed catch piece for said arm to engage whereby the ratchet lever and the grappling device are maintained in an intermediate position in opposition to the lever-spring pending a second actuation of the lever by the pawl, with provisions for taking the arm out of alinement with the catch piece in such actuation substantially as and for the purpose described.

18. In a machine of the class described the combination of depressible keys, attachments settable thereat in fixed relation thereto and having means of a yielding nature constantly tending to depress the keys; and automatic key-restoring means acting intermittently in opposition to said yielding means.

19. In a machne of the class described the combination of depressible keys, attachments settable thereat in fixed relation thereto and having spring-pressed plungers constantly tending to depress the keys; and automatic key-restoring means acting intermittently in opposition to said yielding means.

20. In a machine of the class described the combination of depressible keys, attachments settable thereat in fixed relation thereto and having spring-pressed plungers constantly tending to depress the keys; and automatic. key-restoring means acting intermittently in opposition to said yielding means; together with manipulative means for withdrawing the plungers.

21. In a machine of the class described the combination of a series of depressible keys; a fixed guide extending along the same; a holder slidable on said guide; a spring-actuated plunger mounted in said holder and adapted to exert constant pressure upon a selected key; and means for retracting said plunger.

ALLEN A. HORTON.

Witnesses:
R. W. FAIRCHILD,
R. S. MIELERT.